April 13, 1965 — B. E. ELLIOTT — 3,178,203
TANDEM TRAILER STEERING MECHANISM
Filed Aug. 29, 1962
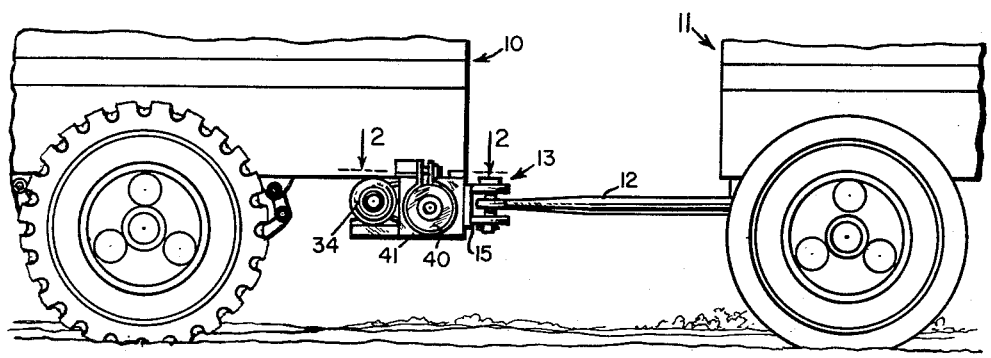
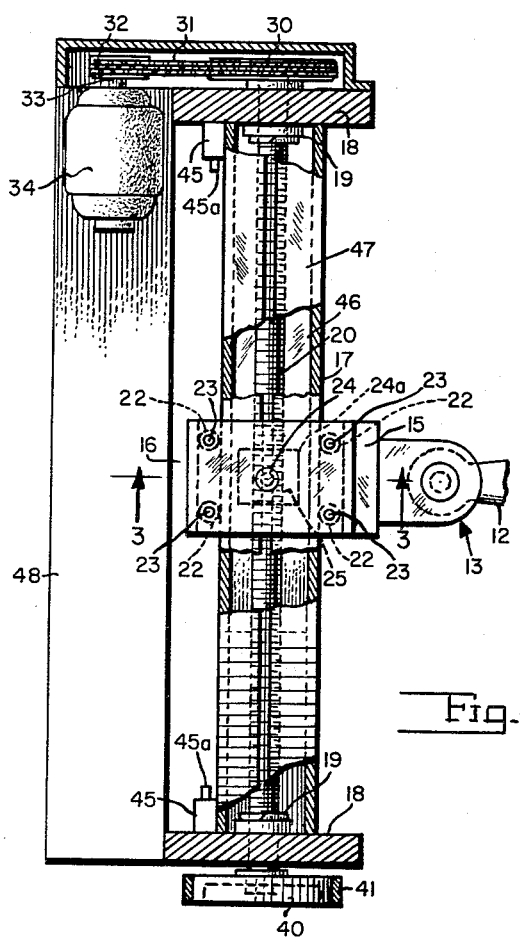
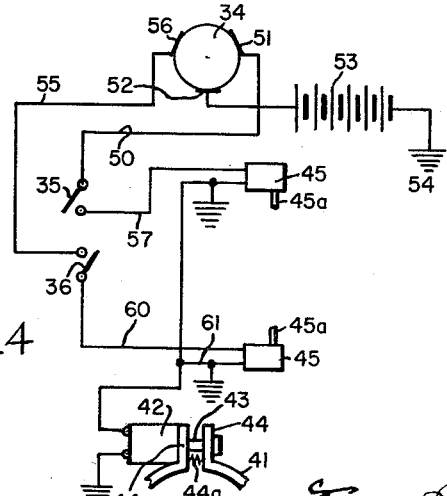
Inventor:
Bernard E. Elliott

United States Patent Office 3,178,203
Patented Apr. 13, 1965

3,178,203
TANDEM TRAILER STEERING MECHANISM
Bernard E. Elliott, 3520 SE. 7th, Portland, Oreg.
Filed Aug. 29, 1962, Ser. No. 220,245
1 Claim. (Cl. 280—470)

This invention relates to a trailer steering mechanism, and has as its primary object the provision of an improved means for steering the rear trailer of a towing vehicle when one or more than one trailer is being towed.

An additional object of the invention is the provision of an electrically movable drawbar adapted to be secured to the rear of a leading vehicle and connected to the drawbar or other steering media of the following vehicle.

An additional object of the invention is the provision of such a movable drawbar block which may be remotely controlled from the cab of the truck, by means of an electrical circuit.

A further object of the invention is the provision of brake means in association with the movable drawbar which will hold the hitch in any desired transverse position.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a fragmentary schematic view of the movable drawbar mechanism of the instant invention attached to a leading vehicle, together with a fragment of the trailing vehicle and its associated trailer.

FIGURE 2 is an enlarged sectional view of the movable drawbar mechanism of FIGURE 1 taken in the plane of a section line 2—2 and transversely thereof.

FIGURE 3 is a transverse sectional view illustrating the movable drawbar mechanism, and taken on the line 3—3 of FIG. 2.

FIGURE 4 is a schematic wiring diagram of the present invention.

Having reference now to the drawings in detail, there is generally indicated at 10 a leading vehicle, which may be the truck or first trailer of a series of tandem trailers, the following trailer being generally indicated at 11. The following trailer 11 is provided with a drawbar 12 together with a conventional heavy duty hitch 13 of any standard type, which is in turn mounted on a plate 15. Plate 15 comprises an integral part of a bearing box 16 along a housing 17 which extends across the rear end of the leading vehicle. Housing 17 includes a pair of end plates 18, each of which is provided with a bearing 19, in which is rotatably mounted one end of a threaded shaft 20. Side walls 21 of housing 17 provide bearing surfaces for rollers or bearings 22 which are rotatably mounted on axles 23 carried vertically in bearing box 16 which serve to align the same. A shaft 24 carries a block 24a which has an interiorly threaded transverse bore 25 therein through which shaft 20 extends, the arrangement being such obviously that rotation of threaded shaft 20 will cause linear movement of block 24a and its associated bearing box 16 and hitch 13. Such movement will in turn be imparted to the drawbar 12, and will effectually position the hitch with the trailing vehicle 11.

Rotary movement of shaft 20 is effected by means of a sprocket 30 carried at one end thereof, which in turn is driven by a chain 31 from a sprocket 32 mounted on the drive shaft 33 of a reversible electric motor 34.

Motor 34 is operable in either of two directions by means of a pair of switches 35 and 36 which are suitably mounted in the cab of the truck, as for example, on the dashboard, and which are shown schematically in FIGURE 4.

A brake drum 40 is provided at the opposite end of threaded shaft 20 and is provided with a brake band 41 which operates by means of a solenoid 42, which when energized projects a core 43 to expand a pair of spaced lugs 44 which in turn release brake band 41 around brake drum 40 to permit rotation of shaft 20. A heavy duty spring 44a normally holds lugs 44 together to clamp brake band 41 about drum 40, precluding rotation of shaft 20. Deenergization of solenoid 42 is effected by means of one of two push button type switches 45, one positioned adjacent each end wall 18 of housing 17.

As best shown in FIGURE 3, housing 17 is also provided with a bottom wall 46 and a top wall 47 having longitudinal slots therethrough, the entire assembly including the motor 34 being mounted on the frame 48 of the leading vehicle.

Referring now to FIGURE 4, energization of motor 34, and consequent rotation of shaft 20 is effected in one direction by closure of switch 35, which through a wire 50 extends to a brush 51 and thence from a common brush 52 through the vehicle battery 53 to ground as at 54. Rotation of the motor 34 is effectuated in the opposite direction by means of switch 36 through a wire 55 to a brush 56 and thence through common brush 52 and battery 53 to ground 54. Excessive movement of the bearing box 16 and its associated hitch 13 and consequently the drawbar of the trailing vehicle is precluded by the engagement of box 16 with the switch button 45a of either of switches 45 in accordance with the direction in which the vehicle is moving. When switch 35 is closed, for example, one of switches 45 is energized through a wire 57 from battery 53, but when its button 45a is pressed, the motor circuit is broken, as well as the circuit to the solenoid coil 42, permitting spring 44a to clamp brake band 41 about brake drum 40. Similarly, when the switch 36 is closed the other of switches 45 is energized from battery 53 through a wire 60, and from which switch a wire 61 leads to solenoid 42 and the circuit is similarly broken to de-energize the motor circuit and the solenoid upon movement of the parts in the opposite direction.

From the foregoing it will now be seen that there is herein provided an improved transversely movable drawbar block which may be energized from the cab of the towing vehicle for effectuating the steering of a trailer or the rearmost of one or more trailers, which will positively hold the trailer hitch in a selected position with a minimum of effort and difficulty, and which is also provided with automatically actuable brake means which will positively preclude excessive movement of the device.

It will also be seen that there is herein provided a movable drawbar which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

In a movable drawbar for a towing vehicle, a housing adapted to be secured transversely across the rear of the frame of a leading vehicle, said housing including end walls, top and bottom walls, a front wall and a rear wall, said top and bottom walls having longitudinal slots therein, a bearing box movably mounted on said housing and said bearing box including a rearwardly disposed plate, means on said plate for connecting a trailing vehicle thereto, a block arranged in said housing and said block having an internally threaded bore therethrough, vertically disposed shaft members extending through the slots in the top and bottom walls and connected to said box and block, a threaded shaft journalled in said end walls and having its extremities extending therethrough, said shaft extending through said threaded bore, a sprocket on an end of said shaft, a reversible electric motor operatively connected to said sprocket, remotely positioned switch means for selectively actuating said motor in either direction, axles connected to said box, guide rollers on said axles engaging the front and rear walls of said housing insuring alignment of said box during longitudinal travel along said housing occasioned by rotation of said threaded shaft, and brake means for retarding rotation of said threaded shaft on the other end of said shaft from said sprocket, said brake means including a brake drum at the opposite end of the threaded shaft from the sprocket, a brake band associated with said brake drum and said brake band including contiguous lugs, a spring member interposed between said lugs for normally biasing said lugs toward each other, a solenoid for selectively releasing and operating said brake means, a push botton switch interiorly of each end wall of said housing for automatically actuating said solenoid operated brake means when engaged by said box at either end of its path of travel, and an electrical circuit including conductors electrically connected to said motor, remotely positioned switch means, said solenoid, and said push button switches, and wherein when one of said push button switches is engaged by said box, the electrical circuit to the motor as well as to the solenoid is interrupted and broken to de-energize the motor and solenoid, and wherein the remotely positioned switch means is adapted to be selectively actuated to simultaneously energize the motor and release the brake means, or to de-energize the motor and simultaneously apply the brake means.

References Cited by the Examiner

UNITED STATES PATENTS

| 706,875 | 8/02 | Allen | 280—471 X |
| 1,235,082 | 7/17 | Von Brethorst | 280—470 |
| 2,465,601 | 3/49 | Ochtman. | |

FOREIGN PATENTS

| 812,228 | 8/51 | Germany. |

A. HARRY LEVY, *Primary Examiner.*

LEO FRIAGLIA, *Examiner.*